Jan. 8, 1929.  1,698,251
T. W. ADAMS
TUBE CUTTING MACHINE
Filed Oct. 6, 1927   3 Sheets-Sheet 1
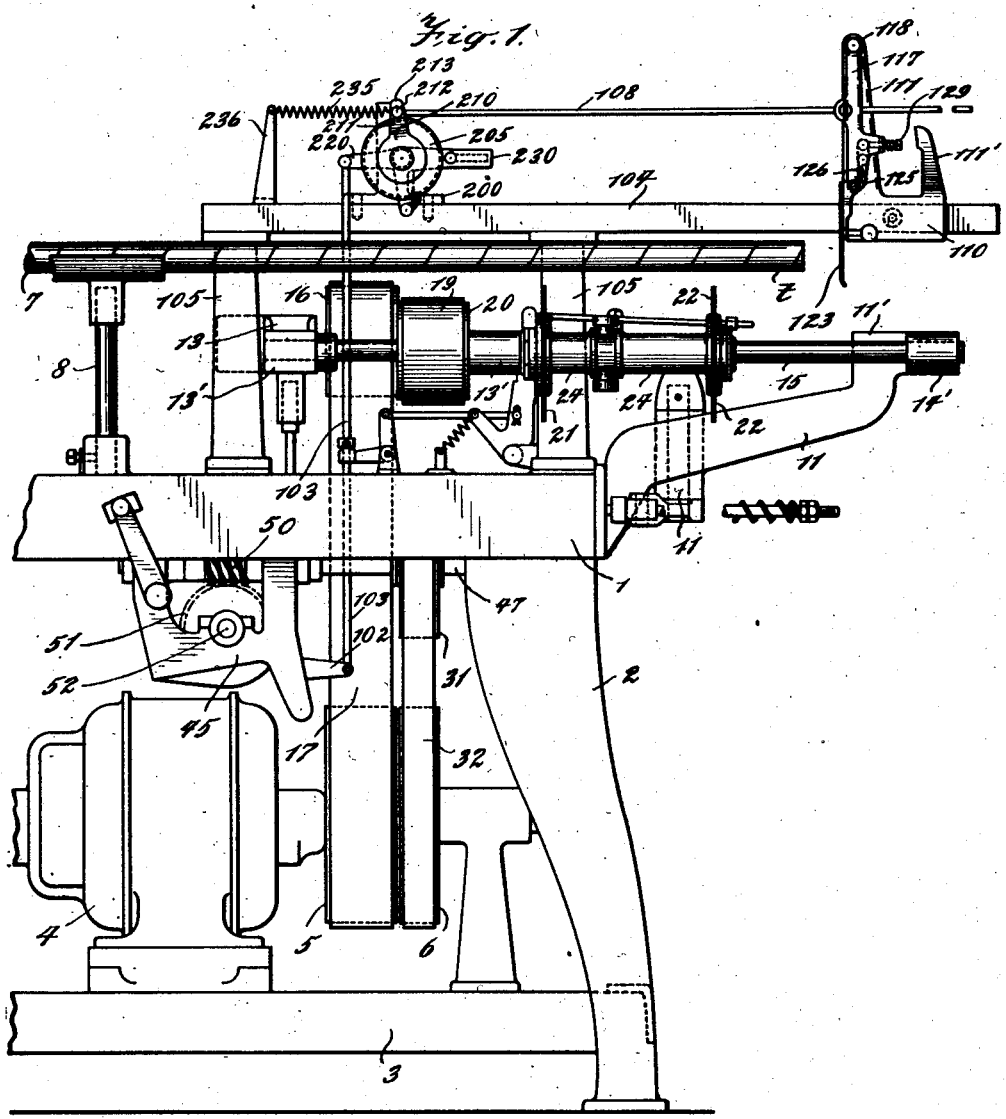
INVENTOR
BY
ATTORNEY Jan. 8, 1929.
T. W. ADAMS
1,698,251
TUBE CUTTING MACHINE
Filed Oct. 6, 1927  3 Sheets-Sheet 2
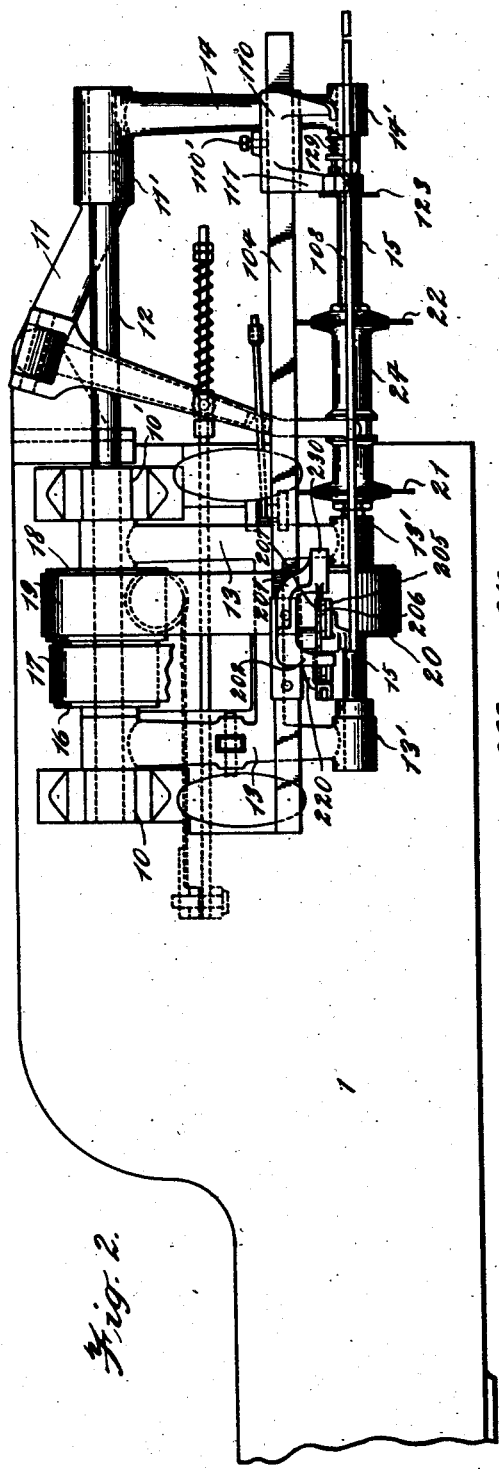
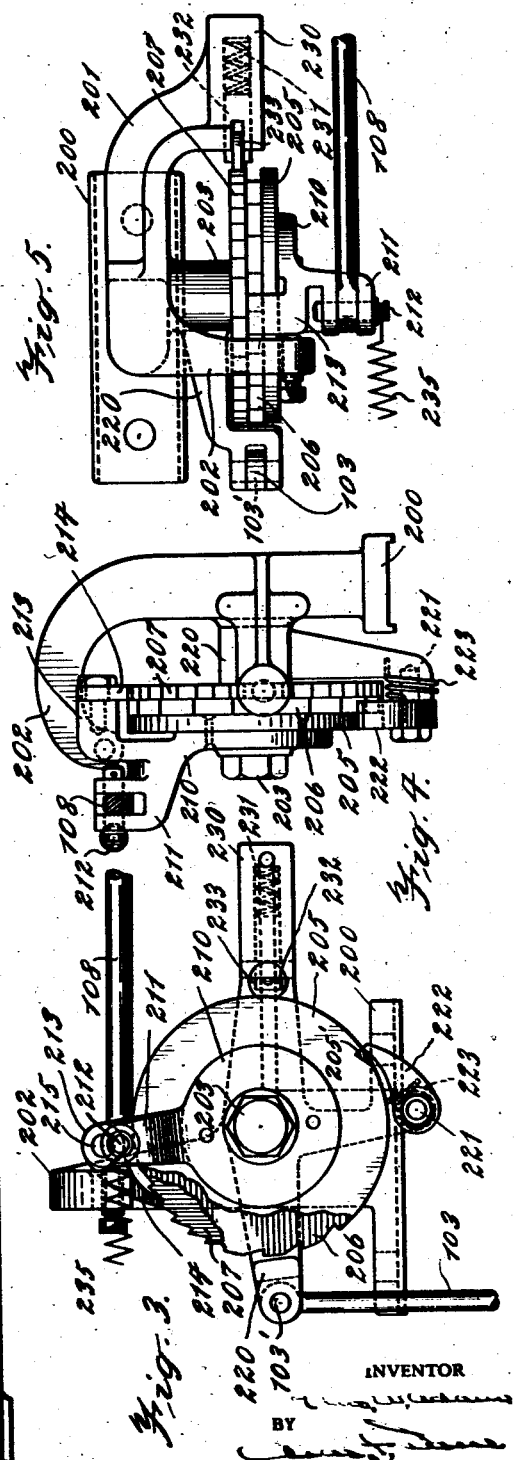
INVENTOR
BY
ATTORNEY Jan. 8, 1929.
T. W. ADAMS
1,698,251
TUBE CUTTING MACHINE
Filed Oct. 6, 1927
3 Sheets-Sheet 3
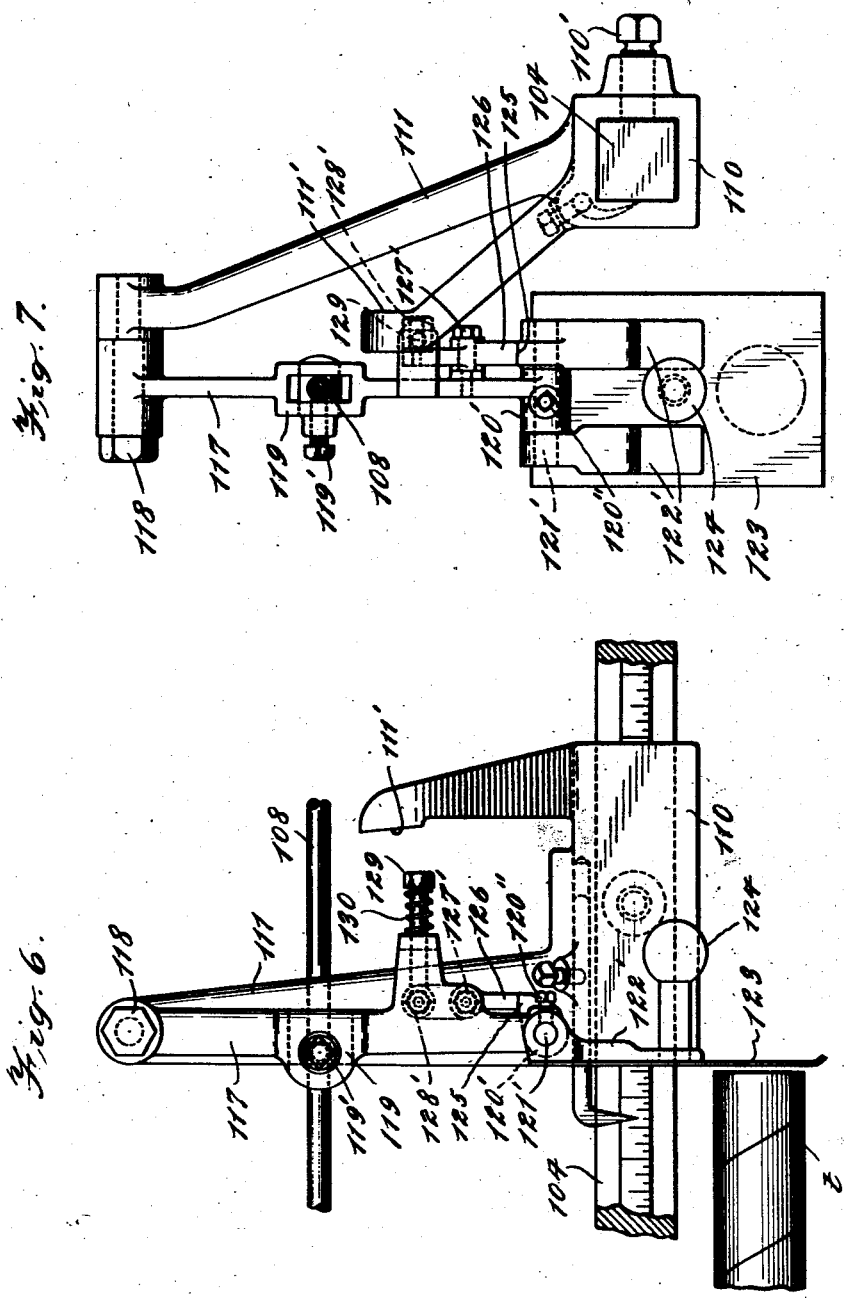
INVENTOR
BY
ATTORNEY Patented Jan. 8, 1929.

1,698,251

UNITED STATES PATENT OFFICE.

THOMAS W. ADAMS, OF ROCHESTER, NEW YORK, ASSIGNOR TO M. D. KNOWLTON COMPANY, OF ROCHESTER, NEW YORK, A CORPORATION OF NEW YORK.

TUBE-CUTTING MACHINE.

Application filed October 6, 1927. Serial No. 224,327.

The invention relates to tube cutting machines for severing multiple sections from the tubing fed through the machine, at each operation, of the general type shown in my application Serial No. 196,351, filed June 3, 1927, and has for its object to provide machines of this general character with a simplified trip mechanism for controlling the cutting operations and with means for suspending the control of the trip mechanism during the discharge of the cut section or sections following the initial or first cut section.

The invention is illustrated in the accompanying drawings, in which:—

Fig. 1 is a side elevation of the apparatus.

Fig. 2 is a plan view thereof.

Fig. 3 is a side elevation of the mechanism for suspending the control of the trip mechanism.

Fig. 4 is an end elevation of the same.

Fig. 5 is a plan view thereof.

Fig. 6 is a side elevation of the trip mechanism.

Fig. 7 is an end elevation thereof.

In the application aforesaid, there is illustrated and described a machine for simultaneously cutting multiple sections from a tubing fed continuously through the machine, with a special form of trip device actuated by the advancing end of the uncut tubing for initiating and controlling the cutting operations and having associated therewith means for successively discharging the cut sections from the machine in the interval between successive cutting operations. The machine of the present invention is, in all respects, similar to that shown in the application aforesaid, except that it involves a different type of trip mechanism actuated by the advance end of the uncut tubing to initiate the operation of the cutting mechanism, and includes a novel means for suspending the control of the trip mechanism with respect to the cutting operation during the discharge of the cut sections, such discharge being effected by the advance of the uncut tubing forcing the cut sections off of the end of the supporting mandrel.

Referring now particularly to Figs. 1 and 2 of the drawings, 1 indicates the bed or table of the machine supported by legs 2 connected by a cross frame 3, carrying a motor 4, upon the shaft of which motor are mounted belt pulleys 5 and 6.

Mounted above the top of the table is a mandrel 7, which may constitute a part of a tube forming machine, said mandrel serving to guide the tubing $t$ through the cutting machine. A vertically adjustable pedestal 8 mounted on the top of the table 1 serves as a support for the tubing and mandrel in advance of the cutting mechanism.

Adjustably secured to the top of the table 1 are pedestals 10, 10' in which is journaled a horizontal shaft 12, the outer end of which is also journaled in a bearing 11' on a bracket 11 secured to the front end of the table. Keyed to the shaft 12 in proper spaced relation are two arms 13, 13 provided at their outer ends with journal bearings 13', 13', which support an arbor 15, the outer end of which is also journaled in a bearing 14' on an arm 14 keyed to the outer end of the shaft 12, the several parts being so arranged that the arbor 15 is adapted to be swung about the shaft 12 as an axis so as to move the arbor toward and from the mandrel 7 and to maintain the mandrel and arbor in parallelism. The arbor 15 is provided with splines or ribs which engage corresponding grooves in a spool support 24 which carries the cutters 21 and 22, so that the spool and the cutters rotate with the arbor and are slidable longitudinally thereon.

The cutters, preferably in the form of disk saws, are spaced at intervals to determine the length of the sections to be cut from the tubing and, while in the exemplary machine illustrated, two of such saws are shown, it will be apparent that any desired number of saws may be used without departing from the invention.

The saw arbor 15 is continuously driven from the motor by means of a pulley 5 on the motor shaft, which operates a belt 17 engaging a member 16 of a double pulley loosely mounted on shaft 12, the mating pulley 18 operating a belt 19 which engages a pulley 20 fast on arbor 15.

Journaled in brackets secured to the under side of the table 1 is a shaft 47 which is continuously driven from the shaft of the motor 4 by means of pulley 6, belt 32 and pulley 31, the latter being fast to said shaft 47. Keyed to the shaft 47 is a worm 50 which meshes with a worm wheel 51 fast to a cross shaft 52, mounted in bearings on a bracket 45 secured to the table top.

The shaft 47 also carries the other elements of the mechanism which controls the swinging movement of the arbor carriage toward and from the tubing and which effects the return of the saws to their initial position after each cutting operation, which mechanism is described in detail in the application aforesaid, and includes a rock lever 102, which controls the engagement and disengagement of the clutch members by means of which the operating devices carried by the shaft 52 are put into and out of commission, the rock lever 102 being actuated by pull rod 103, which, in turn, is connected to the trip mechanism engaged by the advancing end of the tubing as the latter passes through the machine, the lifting of the rod 103 being effective to rock the lever 102 and permit the clutch members to become engaged, thereby connecting the actuating mechanism on shaft 52, as set forth in detail in the aforesaid application.

Mounted on the pedestals 105, which are secured to the top of the table 1, is a square bar 104 which extends longitudinally of the machine adjacent to and somewhat above the mandrel 7. Slidably mounted on this bar 104 is a frame 110, which is secured in the desired adjusted position on the bar by means of a set screw 110′, said frame having an upstanding bracket 111, in the upper end of which is mounted a stud 118 which serves as a pivotal support for a pendent lever 117 provided with an eye 119 intermediate its length, which carries a clamp 119′ by means of which pull rod 108 is adjustably attached to said pendent arm or rock lever 117. The lower end of the rock lever is finished with an eye 120′ in which is secured a pintle 121′ by means of a set screw 120″. Journaled on the projecting ends of the pintle 121′ are lugs 122′ to which are secured a trip plate 123, the latter being locked in general vertical alignment with the rock arm 117 by means of a latch device comprising an arm 126 pivoted intermediate its ends by a stud 127′ mounted on the rear face of rock lever 117, the upper end of the arm 126 being provided with a laterally extending pin 128′, which is engaged by the end of a sliding bolt 129 upon which is mounted a helical spring 130, which normally tends to force said bolt 129 outwardly and hold the arm 126 in a vertical position, so that the lower end of said arm engages a shoulder 125 on the adjacent lug 122′ on the trip plate 123. The frame 110 is also provided with a laterally extending bracket 111′ which constitutes an abutment or stop engaged by the sliding bolt 129, when the rock lever 117 is swung toward said abutment by the engagement of the oncoming tubing with the attached trip plate 123. The effect of the engagement of the bolt 129 with the abutment 111′ is to move the bolt inwardly against the tension of the spring, thereby rocking arm 126 until the lower end thereof is out of engagement with the shoulder 125, thereby unlatching the trip plate 123 from the swinging arm 117 and permitting the trip plate to swing independently of the latter, and also permitting the rock lever 117 to return to its initial vertical position independently of the movement of the trip plate when the latter is engaged by the tubing; the latching device permitting the stop 125 to snap into engagement therewith after the trip plate has been disengaged by the tubing and swings back to vertical position, which swinging movement is accelerated by the weight 124 attached to the rear of the trip plate.

Inasmuch as the machine is adapted and intended to cut at least two sections from the tubing, at each operation, and as the trip plate 123 and the rock lever 117 to which it is attached, will be swung outward by each advance of the end of the tubing, to effect the tripping in of the clutch and, therefore, a complete cyclical operation of the machine, it is obvious that the advancing end of each cut section of the tubing would effect this cycle of operations, if means were not provided to suspend the control of the trip device with respect to the clutch and the associated mechanism until the cut sections have been discharged from the machine. The means for effecting the suspension of the control of the trip mechanism while the cut sections are being discharged from the machine is as follows: The swinging movement of the rock lever 117 by the advance of the tubing moves pull rod 108 in the same direction, thereby exercising a lifting movement on rod 103 which rocks lever 102 and the latter moving out of engagement with the stop lug on the clutch mechanism as in the machine of the aforesaid application, permits the clutch members to engage and thereby couple the actuating mechanism on the shaft 52 to the latter and, therefore, the means for suspending the control of the clutch members by the trip mechanism is interposed in the connections between pull rod 108 and lift rod 103. Fixed to the bar 104 is a bracket 200 having a laterally extending arm 201 and a forwardly extending arm 202. Mounted in the body of the bracket and extending horizontally therefrom is a stud 203, upon the outer end of which is a journal disk 205 having a single tooth 205′ in its periphery. Secured to the outer face of the disk is a disk 210 having a clevised bracket extension 211 to which the end of pull rod 108 is secured by a cross pin 212, said bracket extension 211 having a lateral arm 213 carrying a pin 215, upon which is pivoted a pawl 214, said pawl cooperating with the teeth of a ratchet disk 207 loosely journaled on the pintle 203, which ratchet disk has secured thereto a second ratchet disk 206, which is, therefore, interposed between disks 205 and 207. The disk 207 is provided with twice as many teeth as disk 206 the number of teeth on disk 207 preferably being forty, while those on disk 206 are twenty in number separated by unbroken peripheral edges which overlap adjacent interdental spaces on disk 207, as shown in Fig. 3, so that the edges of alternate teeth on disk 207 register with the edges of successive teeth on disk 206. Mounted for swinging movement on the pintle 203 between the disk 207 and bracket 200 is a bell crank 220, to the lower end of the vertical arm of which is connected a pawl 222 by means of pin 221, the face of the pawl being broad enough to overlap the peripheral edges of disks 205 and 206, and being held in engagement with said peripheral edges by means of a helical spring 223. To the horizontal arm of the bell crank, the upper end of the lift rod 103 is attached by means of a pin 103'. A helical spring 235 attached to the outer end of pin 212, by means of which latter the pull rod 108 is attached to the disk 210, is anchored at its opposite end to an upstanding bracket 236 attached to the bar 104, said spring normally serving to return the parts connected to the pull rod 108 to their normal inoperative positions, as indicated in Fig. 1.

The horizontal arm 201 of bracket 200 is provided with a socketed extension 230 in which is mounted a slide 232, in the outer end of which is journaled a roller 233, which is forced into frictional engagement with the teeth on the peripheral edge of ratchet disk 207, by means of a compression spring 231 and serves as a brake to hold the ratchets 207 and 206 in any adjusted position thereof and prevent overthrow of the same.

The operation of the machine is as follows: The tubing is fed into the machine, with a continuous rotary motion, upon the mandrel 7, the latter being maintained in proper feeding position by the guide pedestal 8 and extending through the cutting machine to a point just short of the vertical position of the trip plate 123, so that the latter will clear the end of the mandrel, but the mandrel will nevertheless constitute an effective support for the tubing during the entire cutting operation, and for the cut sections of the tubing until the latter are forced off of the mandrel by the advance of the uncut tubing. When the advance end of the tubing engages the trip plate 123, the latter is moved forward and, as the trip plate is locked to the rock arm 117, the latter is swung on its pivot 118, thereby moving pull rod 108 in the same direction. This swinging movement continues until spring actuated pin 129 engages detent 111' and is forced inward against the tension of spring 130 and rocks arm 126 until the lower end of the latter disengages the stop 125 carried by the lug 122' on the trip plate, thereby permitting the latter to swing independently on its pivot 121', and leaving rock lever 117 free to swing back to its initial position in so far as the movement of the tubing is concerned. The forward movement of rod 108 imparts a partial clockwise rotation to disks 210 and 205, and the single tooth 205' in the periphery of disk 205, which is in registry with one of the teeth of disk 206, engages pawl 222 and swings bell crank 220 with both disks and operates lift rod 103 to rock lever 102, which permits the members of the clutch on shaft 52 to engage and rotate the shaft, either a full revolution or a half revolution, as explained in the application aforesaid, whereby the complete cutting operation will be effected. As soon as the trip plate 123 is unlocked by latch 126, rock lever 117 is swung back into vertical position by the action of spring 235 and pull rod 108, thereby rotating disks 210 and 205 in an anti-clockwise direction, and this movement of disk 210 causes pawl 214 to move ratchet disks 207 and 206 the distance of one tooth of disk 207, thereby bringing one of the blank spaces between the teeth on the periphery of disk 206 under pawl 222, lifting and holding said pawl out of cooperative relation with the single tooth on disk 205. The parts are thus returned to their initial position for the next operation, except for the inoperative relation of pawl 222, as explained. When the first cut section of the tubing is forced off of the end of the mandrel 7, the trip plate 123 drops back into locked engagement with rock lever 117, and the end of the second cut section of the tubing engages the trip plate and swings the latter and rock lever 117 forward to again operate pull rod 108, which again moves disks 210 and 205 clockwise, but, as pawl 222 is held out of engaging relation with the single tooth of disk 205 and all of the teeth of disk 206, by reason of the said pawl riding on the periphery of disk 206 between two of the teeth thereon, no movement of bell crank 220 results, so that this second actuation of the trip mechanism does not affect the operation of the clutch on shaft 47 and the mechanism controlled thereby. When the second cut section of tubing swings trip plate 123 far enough to cause the latch finger 126 to be disengaged, rock lever 117 is again swung back to its initial position by spring 235 and pull rod 108, and pawl 214 moves the ratchet disks 207 and 206 a distance of one tooth of disk 207, which brings a tooth on disk 206 into registry with the single tooth on disk 205, and pawl 222 is permitted to move back into cooperate engagement with the single tooth on disk 205 and the registering tooth on disk 206, ready for the initiation of the next cycle of operations, after the clutch on shaft 47 has been finally disengaged by lever 102, as explained in the application aforesaid. It will be seen, therefore, that the advance end of the uncut tubing actuates the trip mechanism to initiate the cutting operation, but that the next or second actuation of the trip plate by the advance of the second cut section of the tubing causes the end thereof to engage and swing the trip plate 123 and rock lever 117 to actuate pull rod 108, which rocks disks 210 and 205 as before, but this operation is nugatory in so far as control of the clutch on shaft 47 is concerned, as pawl 222 is held out of engagement with the tooth on disk 205, and the teeth on disk 206, as explained, and no actuation of lift rod 103 results.

What I claim is:

1. A tube cutting machine, comprising means for directing a travelling tubing through the machine, means for simultaneously cutting multiple sections from the tubing, and mechanism actuated by the end of the tubing for controlling the cutting operations, said mechanism including means for rendering the same ineffective during the discharge of any cut section following the first cut section and the engagement of the mechanism by such following cut section.

2. A tube cutting machine, comprising means for directing a travelling tubing through the machine, means for simultaneously cutting multiple sections from the tubing, and mechanism actuated by the end of the tubing for controlling the cutting operations, said mechanism including a pawl and ratchet device for rendering the same ineffective during the discharge of any cut section following the first cut section and the engagement of the mechanism by such following cut section.

3. A tube cutting machine, comprising means for directing a travelling tubing through the machine, multiple rotary cutters having a movable support, a constantly driven shaft, mechanism for projecting the cutters into the path of travel of the tubing, said mechanism including a clutch connection with said shaft, a trip mechanism operated by the tubing to engage the clutch members to transmit motion from the shaft to the cutter projecting mechanism, and means to render the trip mechanism ineffective to control the clutch members during the discharge of any cut section following the first cut section and the engagement of the trip mechanism by such following cut section.

4. A tube cutting machine, comprising means for directing a travelling tubing through the machine, multiple rotary cutters having a movable support, a constantly driven shaft, mechanism for projecting the cutters into the path of travel of the tubing, said mechanism including a clutch connection with said shaft, a trip mechanism operated by the tubing to engage the clutch members to transmit motion from the shaft to the cutter projecting mechanism, and means including a pawl and ratchet device to render the trip mechanism ineffective to control the clutch members during the discharge of any cut section following the first cut section and the engagement of the trip mechanism by such following cut section.

5. A tube cutting machine, comprising means for directing a travelling tubing through the machine, multiple rotary cutters having a movable support, a constantly driven shaft, mechanism for projecting the cutters into the path of travel of the tubing, said mechanism including a clutch connection with said shaft, a trip plate engaged by the tubing, and means connecting said trip plate with the clutch to engage the clutch members and transmit motion from the shaft to the cutter projecting mechanism, said connecting means including mechanism for rendering the same inoperative during the discharge of any cut section following the first cut section and the engagement of the trip plate by such following cut section.

6. A tube cutting machine, comprising multiple cutters having a movable support, a constantly driven shaft, mechanism to project the cutters into the path of travel of the tubing, said mechanism including a clutch connection with said shaft, and mechanism controlling the clutch connection having a trip device engaged by the tubing and including means to render the controlling mechanism ineffective when the trip device is operated by a cut section following the first cut section.

7. A tube cutting machine, comprising multiple cutters having a movable support, mechanism operative to project the cutters into the path of travel of the tubing, means controlling the operation of the projecting mechanism, a trip device connected with said controlling means and normally positioned to be engaged by the travelling tubing to operate said controlling means to release the projecting mechanism, and connections between the trip device and the controlling means including mechanism to render said connections inoperative when the trip plate is engaged by a cut section following the first cut section.

8. A tube cutting machine, comprising multiple cutters having a movable support, mechanism operative to project the cutters into the path of travel of the tubing, means controlling the operation of the projecting mechanism, a rock lever mounted for movement in a vertical plane and adjustably connected with said controlling means, a trip plate attached to said lever and normally positioned to be engaged by the travelling tubing to move the lever and operate said controlling means to release the projecting mechanism, and connections between the rock lever and the controlling means including mechanism to render said connections inoperative when the trip plate is engaged by a cut section following the first cut section.

9. A tube cutting machine, comprising multiple cutters having a movable support, mechanism operative to project the cutters into the path of travel of the tubing, means controlling the operation of the projecting mechanism, a rock lever mounted for movement in a vertical plane and connected with said controlling means, a trip plate pivoted to said lever, a latch for locking the trip plate and lever for movement together when the trip plate is engaged by the advancing tubing and thereby operating said controlling means to release the cutter projecting mechanism, and means connecting the lever and the controlling means including a pawl and ratchet device operative when the first section of the tubing engages the trip plate and inoperative when a succeeding cut section engages the trip plate.

10. A tube cutting machine, comprising cutters having a movable support, mechanism operative to project the cutters into the path of travel of the tubing, means controlling the operation of the projecting mechanism, a pivoted lever connected with said controlling means, a trip plate pivoted to the lever and positioned to be engaged by the end of an approaching tubing to rock the lever on its pivot and actuate said controlling means to release the cutter projecting mechanism, a latch operating to lock the trip plate to the lever during the first part of the movement of the lever on its pivot, and means cooperative with the latch upon the continued movement of the lever to operate the latch at predetermined times to release the trip plate.

11. A tube cutting machine, comprising cutters having a movable support, mechanism operative to project the cutters into the path of travel of the tubing, means controlling the operation of the projecting mechanism, a pivoted lever connected with said controlling means, a trip plate pivoted to the lever and positioned to be engaged by the end of an approaching tubing to rock the lever on its pivot and actuate said controlling means to release the cutter projecting mechanism, a latch pivoted to the lever to lock the trip plate to said lever during the initial swinging movement of the latter, a spring bolt slidably mounted on the lever and engaging the latch, and a detent engaged by said spring bolt to release the latch.

12. A tube cutting machine, comprising means for directing a travelling tubing through the machine, multiple rotary cutters having a movable support, a constantly driven shaft, mechanism for projecting the cutters into the path of travel of the tubing, said mechanism including a clutch connection with said shaft, a trip mechanism operated by the tubing to engage the clutch members to transmit motion from the shaft to the cutter projecting mechanism, and connections between said trip mechanism and the clutch including a pull rod, a pivoted plate connected to said pull rod and having a single tooth in its edge, a pair of connected ratchet disks pivoted coaxially with said plate, the first disk adjacent said plate having teeth separated by blank spaces, the second disk having teeth which alternate in registry with the teeth and the blank spaces of the first disk, a pawl carried by the plate cooperating with the teeth of the second disk, a bell crank journaled coaxially with the plate and disks, and a pawl carried by the bell crank and adapted to be engaged alternately with the single tooth of the plate and a registering tooth in the second disk and with a blank space on the said first disk; whereby only alternate strokes of the pull rod will be effective to operate the bell crank to actuate the clutch.

13. A tube cutting machine comprising means for directing a travelling tubing through the machine, multiple rotary cutters having a movable support, a constantly driven shaft, mechanism for projecting the cutters into the path of travel of the tubing, said mechanism including a clutch connection with said shaft, a trip mechanism operated by the tubing to engage the clutch members to transmit motion from the shaft to the cutter projecting mechanism, and connections between the trip mechanism and the clutch effective to actuate the clutch only on alternating operations of the trip mechanism.

14. A tube cutting machine comprising means for directing a travelling tubing through the machine, multiple rotary cutters having a movable support, a constantly driven shaft, mechanism for projecting the cutters into the path of travel of the tubing, said mechanism including a clutch connection with said shaft, a trip mechanism operated by the tubing to engage the clutch members to transmit motion from the shaft to the cutter projecting mechanism, and connections between the trip mechanism and the clutch including a pawl and ratchet device operative to actuate the clutch only on alternate operations of the trip mechanism.

In testimony whereof I affix my signature.

THOMAS W. ADAMS.